US008857315B2

(12) United States Patent
Kelly et al.

(10) Patent No.: US 8,857,315 B2
(45) Date of Patent: Oct. 14, 2014

(54) PRESSURE RELIEF SYSTEM FOR ESPRESSO MAKER

(75) Inventors: Luke Kelly, Bonner Springs, KS (US); Winston Fliess, Olathe, KS (US)

(73) Assignee: BE Intellectual Property, Inc., Wellington, FL (US)

( * ) Notice: Subject to any disclaimer, the term of this patent is extended or adjusted under 35 U.S.C. 154(b) by 46 days.

(21) Appl. No.: 13/424,662

(22) Filed: Mar. 20, 2012

(65) Prior Publication Data
US 2012/0240776 A1 Sep. 27, 2012

Related U.S. Application Data

(60) Provisional application No. 61/467,810, filed on Mar. 25, 2011.

(51) Int. Cl.
*A47J 31/40* (2006.01)
*A47J 31/46* (2006.01)
(52) U.S. Cl.
CPC ..................................... *A47J 31/46* (2013.01)
USPC ........................................................... 99/280
(58) Field of Classification Search
USPC ........................................................... 99/280
See application file for complete search history.

(56) References Cited

U.S. PATENT DOCUMENTS

| | | | |
|---|---|---|---|
| 5,393,540 A * | 2/1995 | Bunn et al. | 426/231 |
| 6,161,469 A | 12/2000 | Rolla | |
| 6,701,826 B2 | 3/2004 | Wu | |
| 2004/0177760 A1 * | 9/2004 | Eicher | 99/275 |
| 2005/0160918 A1 * | 7/2005 | Winstanley et al. | 99/279 |
| 2011/0192287 A1 | 8/2011 | Riessbeck et al. | |

OTHER PUBLICATIONS

International Search Report, Jun. 12, 2012, 2 pages.

* cited by examiner

*Primary Examiner* — Dana Ross
*Assistant Examiner* — Renee L Miller
(74) *Attorney, Agent, or Firm* — Fulwider Patton LLP

(57) ABSTRACT

A brewing system for brewing a beverage is disclosed having an inlet for receiving fresh water for brewing, and a first solenoid for directing water to a water storage tank when a level in the water storage tank falls below a predetermined level. A pair of pumps direct water from the storage tank to a second solenoid. Two or more brew paths lead away from the second solenoid, each brew path including a heating element to heat the water flowing therethrough. The second prevents overpressurization in the brew paths by routing excess pressurized water from the respective brew path back through the second solenoid and out a drain line leading to a drain, where the path to the drain is not part of the brew path.

3 Claims, 2 Drawing Sheets

PRESSURE RELIEF SYSTEM FOR ESPRESSO MAKER

CROSS-REFERENCES TO RELATED APPLICATIONS

This application claims priority from U.S. Application No. 61/467,810, filed Mar. 25, 2011, incorporated by reference in its entirety.

BACKGROUND

There are many different types of espresso drinks, including cappuccino, cafe latte and cafe mocha. All are made with one or more shots of espresso. A shot of espresso is made by forcing about 1.5 ounces of hot water through tightly packed, finely ground espresso coffee. There are many variables in the process of making a shot of espresso. The temperature of the water, the pressure of the water, the fineness of the ground coffee and how tightly the coffee is packed to name a few. To force the water through the coffee, the simplest espresso machines use pressure that comes from heating water inside a sealed vessel. In this type of machine, the coffee is packed into a funnel-shaped piece of metal that has a tube extending to the bottom of the reservoir. A few ounces of water are put into the reservoir and the top is screwed on.

When the water is heated, pressure builds inside the vessel, and the only way for it to escape is up the tube, through the coffee and out of the tube in the top. Since the end of the tube is under water, the pressure forces the hot water up through the tube. To begin the operation, the brew process is started once the heating vessel has heated the water to the ideal temperature (just below boiling). Ground espresso coffee is poured into the basket and tamped down, and then the portafilter is installed by twisting it into the machine. A small cup is placed beneath the spout, and the valve to the espresso position is opened. The opening of the valve engages the micro-switch that starts a pump, which in turn pressurizes the heating chamber and hot water to about 15 atmospheres (220 psi) of pressure. This forces the hot water through the ground coffee and out of the spouts. Ideally, it should take about 25 seconds for about 1.5 ounces of espresso to come out.

The problem with espresso machines of this type is that the excess buildup of pressure must be relieved after the operation is complete. The residual pressure is relieved through the same valve and spout as the coffee exits. The operator has the potential exposure to the espresso vessel bursting upon the release of the brew head interface. The residual heat and steam causes the potential pressure through the same brew/froth ports, if there is no other means of eliminating the pressure.

SUMMARY OF THE INVENTION

The present invention is an espresso machine that incorporates a pressure relief system that directs excess steam and pressure behind the brewing station, away from the operator. Once a brewing operation is completed, the excess water and/or steam is directed back into a solenoid and rerouted to a drain where the path to the drain is not part of the original brew path.

DETAILED DESCRIPTION OF THE PREFERRED EMBODIMENTS

Figure 1:
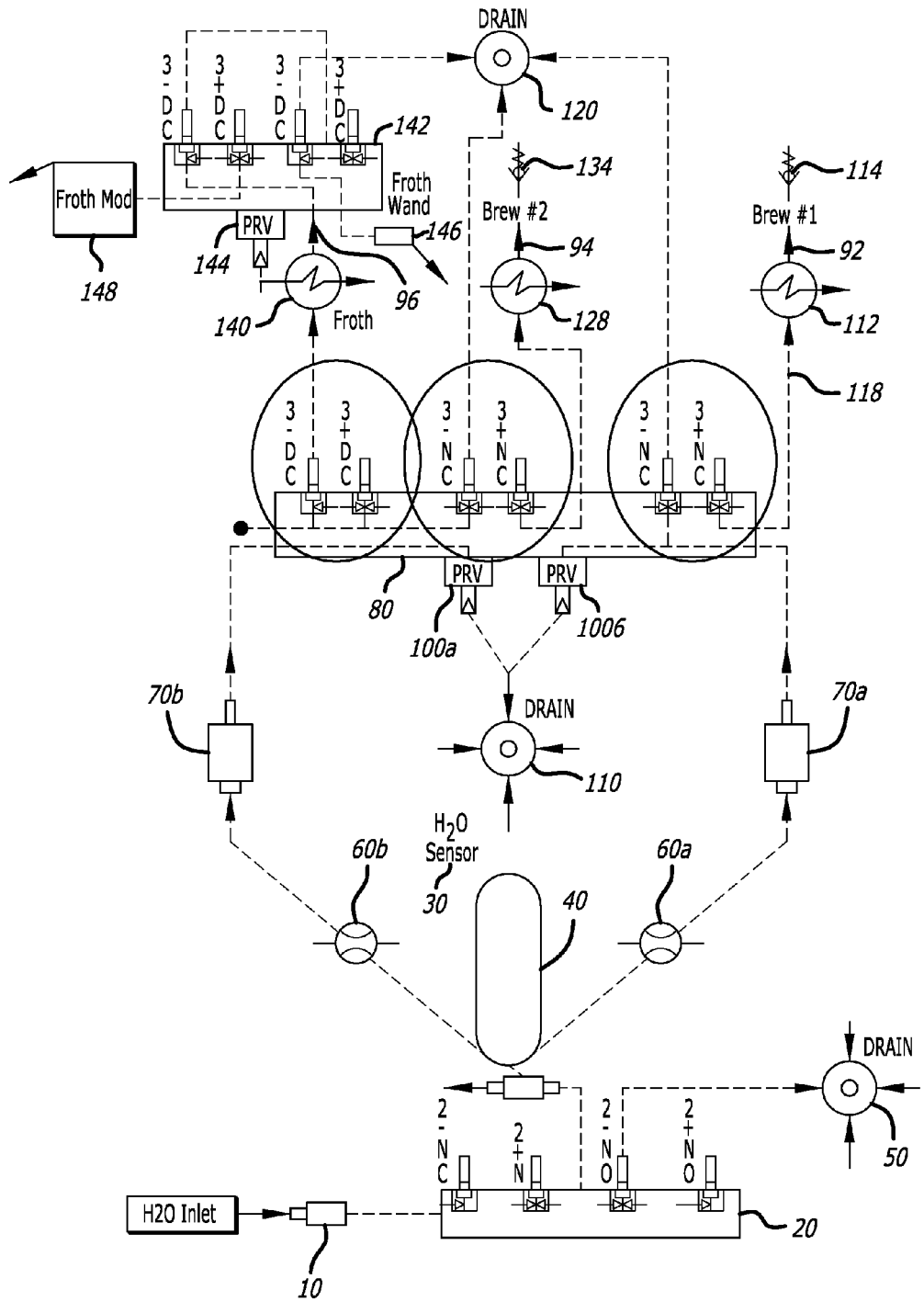
FIG. 1 is a schematic diagram of a first embodiment of the system of the present invention.

FIG. 1 is a schematic diagram of a first embodiment of the present invention, showing a pressure relief system for a brewing apparatus suitable for making beverages such as espresso and the like. The system has a water inlet 10 that connects to a water supply which feeds the system with fresh cool water to be used in the brewing operation. A two-way solenoid 20 controls the delivery of water into and out of the system by opening and closing a valve based on the water demand, as determined by a water level sensor 30 located in the system's water storage tank 40. The solenoid 20 has two states, energized and non-energized. In the non-energized state, the valve is closed to prevent water from entering the storage tank 40. When the solenoid is energized, the water can flow into the tank 40 and help maintain the tank is a filled condition. The tank 40 can also be emptied by discharging water through the solenoid 20 into the drain 50, such as when the tank needs to be serviced or cleaned, or simply to add fresh water to the tank 40. The solenoid 20 leading to the tank is normally open so that water can pass through to the drain 50 when discharged from the tank 40.

Figure 2:
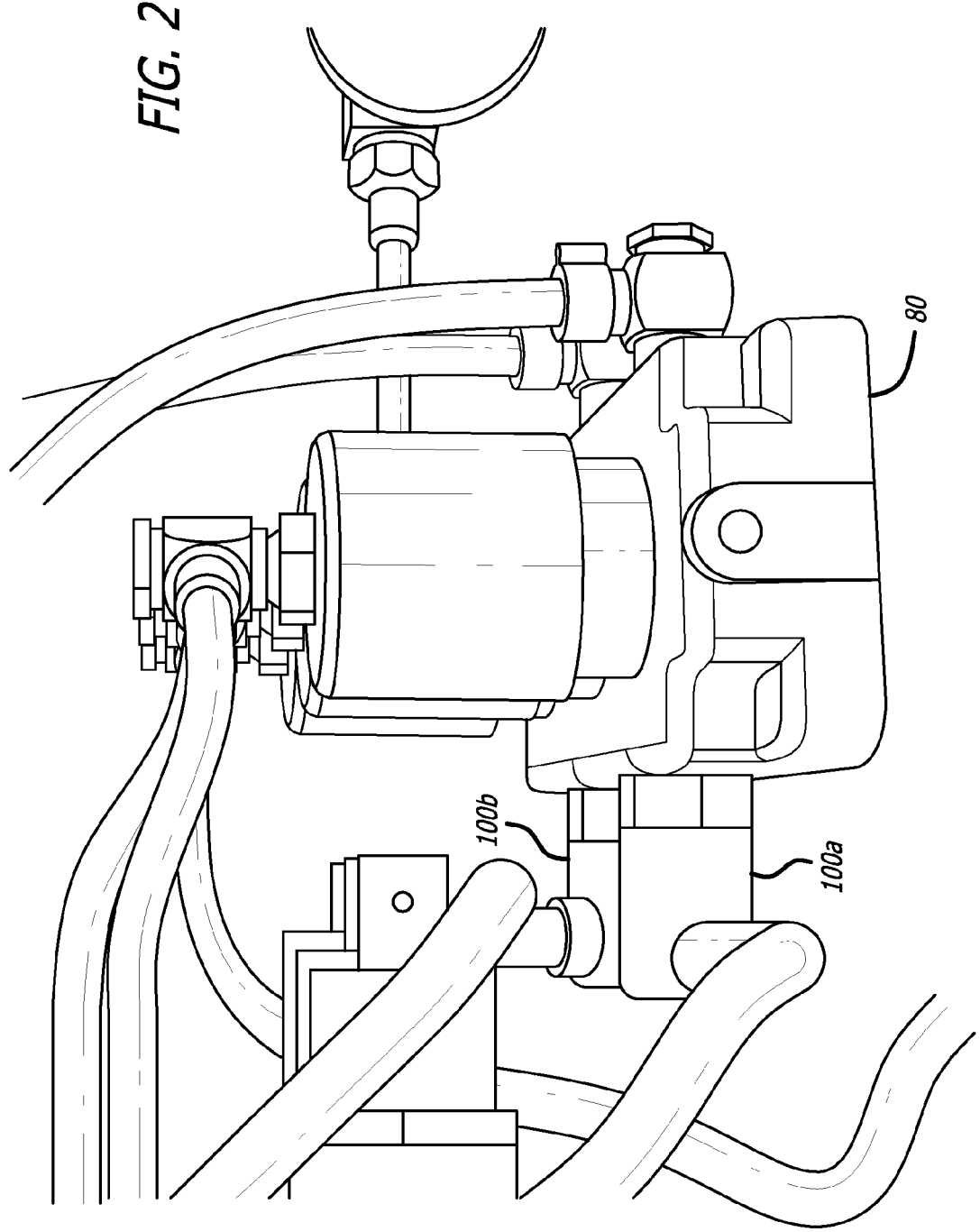
FIG. 2 is an elevated, perspective view of a solenoid and connections shown in the schematic of FIG. 1.

The water storage tank 40 is connected to the solenoid and receives cool water therefrom, and holds water until it is needed for brewing a beverage. The water level is continuously checked by a level sensor 30 that monitors the water level in the tank 40, and sends a signal to the solenoid 20 to open the valve when the water level falls below a predetermined level. When the apparatus is idle, there is no flow through the system. When a request is initiated for either brewing water or steam, the tank 40 is opened and cool water flows through one or two paths as shown. Each path includes a flow meter 60 to monitor and control the amount of water that is delivered from the tank 40. The water passes through the flow meters 60 and through one of two pumps 70a,b that push the water through the system. The pumps 70a,b pump water into a three way solenoid 80 (further illustrated in FIG. 2), pressured to approximately 130 psi. The solenoid 80 has two divisions, where the first pump 70a services the first division, or brewing station 92, and the second pump 70b services the second division, or brewing station 94 and steam generation unit 96. The solenoid 80 is configured with a pair of pressure relief valves 100a, 100b (PRV), one for each division, that allows the solenoid 80 to release water to a drain 110 if the pump 70a,b is pumping water that is collecting due to clogs, malfunction, or other unknown cause to prevent the build-up of excess water pressure in the system. The two PRVs 100a, 100b lead to the drain 110 that carries away waste water from the system.

In the brewing station 92 of the system, when a request is made for brewing a coffee or espresso, the solenoid 80 opens the path from the pump 70a through the solenoid 80 to a heater 112 where the water is heated to two hundred degrees approximately for the brewing operation. The water is then passed through a drip valve 114 and fed to the coffee service outlet. The flow meter 60a controls the amount of water delivered based on a logic programmed into the system, and delivers a prescribed about of water to the heater 112 and to the service outlet. However, there is a residual amount of heated water in the system after the designated water is delivered to the service outlet. The present invention has a path for eliminating that excess heated water to prevent pressure and heat build-up. Namely, the water is passed back through the solenoid 80 and directed to a drain 120 for excess water. In this manner, the system is relieved of a possible pressure build-up of the heated water in the line 118 after the brewing request is fulfilled.

The second pump 70*b* services the brewing station 94 and steam generation unit 96. Brewing station 96 operates essentially like brewing station 92, where water is passed through a heating unit 128 and then a drip valve 134 before exiting the service outlet. Excess water is routed back through the solenoid 80 and to the drain 120, so that heat and pressure cannot build up in the system. The drain is connected to a separate path from the flow of brewing water, so that an operator or the system can discharge the water without passing through the outlet used for dispensing the beverage when operators are present. In both brewing station 92 and brewing station 94, the solenoid 80 is normally in the "NC" or normally closed position until energized by the system to permit water to flow through it to its designated paths. Control of the solenoid 80 is managed by a microcontroller (not shown) that is connected to the flow meters 60*a,b* as well as the pumps 70*a,b* and sensors of the system.

The third path of the solenoid 80, and second path serviced by the second pump 70*b*, is for generating steam that is used for cappuccino and other beverages. Water from the solenoid 80 and the second pump 70*b* is fed to a froth heater 140 that heats the water to near boiling and generates steam. The heated water is fed to a two-way solenoid 142 that includes a pressure relief valve 144 for relieving pressure in the solenoid 142 when the pressure is elevated above a predetermined value, and releases the steam/water to protected area to prevent contact with any operators. The solenoid 142 services two stations, a steam or froth wand 146 that is used to directly steam milk or other beverages and a froth module 148 that holds milk or other beverage and can automatically steam the milk in a procedure that does not require an operator or attendant to wait idly by while the milk is steamed. In both the froth wand 146 and the froth module 148, excess steam and heated water can be routed back through the solenoid 142 and vented to the drain 120 that services the brewing station 92 and brewing station 94 paths. Thus, the venting of excess heated water and steam occurs away from the froth wand 146 and froth module 148 where there is an opportunity for contact with the operator.

It should be noted that while a three-way solenoid 80 is discussed above, the three way solenoid could be replaced with multiple two-way solenoids without any loss of function, and the invention is intended to include such a modification.

From the foregoing, it will be appreciated that specific embodiments of the invention have been described herein for purposes of illustration, but that various modifications may be made without deviating from the spirit and scope of the invention. Accordingly, the invention is not limited except as by the appended claims.

We claim:

1. A brewing system for brewing a beverage comprising:
an inlet for receiving fresh water for brewing;
a water storage tank;
a first three way solenoid disposed between the inlet and the water storage tank having two outgoing fluid paths, a first path leading to the water storage tank, and a second path leading to an overflow drain;
second three-way solenoid having first and second divisions, a first division servicing a froth generator and a second division servicing a brewing station, each division including a pressure relief valve coupled to a first drain leading away from the brewing system;
a froth generator connected to the first division of the second three-way solenoid, said froth generator communicating steam;
a two-way solenoid connected to the froth generator for receiving the steam, the two-way solenoid including a froth delivery device, a pressure relief valve, and a vent path for directing excess steam to a second drain leading away from the brewing system;
a brewing station connected to the second division of the second three-way solenoid valve; and
a steam recirculation path from the brewing station to the second division of the second three-way solenoid to the second drain for routing excess steam from the brewing station.

2. The brewing system of claim 1, including a first flow meter between the water storage tank and the first pump, and a second flow meter between the water storage tank and the second pump.

3. The brewing system of claim 1 wherein the second three-way solenoid valve services a second brewing station, and the system includes a second steam recirculation path from the second brewing station to the second three-way solenoid to the second drain.

* * * * *